US005352768A

United States Patent [19]

Stuber et al.

[11] Patent Number: 5,352,768
[45] Date of Patent: Oct. 4, 1994

[54] ACID TREATMENT OF POLY(ARYLENE SULFIDE) POLYMER REACTION MIXTURE

[75] Inventors: John D. Stuber, Austin, Tex.; Wei-Teh W. Shang; Lacey E. Scoggins, both of Bartlesville, Okla.

[73] Assignee: Phillips Petroleum Company, Bartlesville, Okla.

[21] Appl. No.: 965,644

[22] Filed: Oct. 23, 1992

[51] Int. Cl.$^5$ .............................................. C08G 75/16
[52] U.S. Cl. .................................. 528/486; 525/537; 528/388; 528/487; 528/490
[58] Field of Search .............. 528/486, 487, 490, 388; 525/537

[56] References Cited

U.S. PATENT DOCUMENTS

| | | | |
|---|---|---|---|
| 4,373,091 | 2/1983 | Edmonds, Jr. | 528/528 |
| 4,699,975 | 10/1987 | Katto et al. | 528/486 |
| 4,728,723 | 3/1988 | Nakamura | 528/528 |
| 4,801,664 | 1/1989 | Nesheiwat | 525/528 |
| 4,868,240 | 9/1989 | Ichikawa | 524/525 |
| 5,237,046 | 8/1993 | Schmidt et al. | 528/388 |

FOREIGN PATENT DOCUMENTS

| | | |
|---|---|---|
| 503435 | 9/1962 | European Pat. Off. . |
| 244187 | 11/1987 | European Pat. Off. . |
| 418455 | 3/1991 | European Pat. Off. . |

OTHER PUBLICATIONS

Derwent Abstract Japanese application Publication No. JP 62-205125.
Derwent Abstract Japanese application Publication No. JP 62-223232.

Primary Examiner—John Kight, III
Assistant Examiner—Shelley A. Dodson
Attorney, Agent, or Firm—Beverly M. Dollar

[57] ABSTRACT

A method is provided for producing a poly(arylene sulfide) polymer having reduced amounts of impurities by contacting a poly(arylene sulfide) polymerization reaction mixture with an acid.

10 Claims, No Drawings

ACID TREATMENT OF POLY(ARYLENE SULFIDE) POLYMER REACTION MIXTURE

FIELD OF THE INVENTION

This invention generally relates to poly(arylene sulfide) polymers. This invention relates to a method of reducing impurities in a poly(arylene sulfide) polymer by treating the polymerization reaction mixture.

BACKGROUND

Poly(arylene sulfide) polymers are generally known in the art and are employed in a number of applications due to their high temperature and chemical resistance and good electrical and mechanical properties. Poly(arylene sulfide) polymers are used in the preparation of fibers, films, coatings, injection molding compounds and fiber-reinforced composites.

Impurities in the poly(arylene sulfide) polymer can contribute to certain processing and product problems. Problems include off-gassing, injection mold plate out and corrosion of processing equipment used in injection molding applications. Problems can also include poor adhesion to substrates for coatings and poor adhesion to reinforcing fibers in composites.

It is thus desirable to reduce the amount of impurities in the poly(arylene sulfide) polymer. One method of accomplishing this has been to treat the recovered polymer with an acidic solution. This, however, results in the inclusion of an extra wash and recovery step.

The poly(arylene sulfide) polymer is generally prepared in a reaction employing at least one sulfur-source, at least one dihalogenated aromatic compound and a polar organic compound, optionally with molecular weight modifying agents such as alkali metal salts. The reaction mixture is very basic, contributing to corrosion of the metal contacting the mixture. Certain by-products are formed during the reaction which chemically bind the polar organic compound and render recovery and reuse of the polar organic compound difficult. It would therefore be desirable to have a method for rendering the reaction mixture less basic and for causing the by-products to release the polar organic compound.

SUMMARY OF THE INVENTION

According to this invention, it has been discovered that a poly(arylene sulfide) polymer having reduced amounts of impurities can be produced by contacting a poly(arylene sulfide) polymerization reaction mixture with an acid.

The treatment of the polymerization reaction mixtures with acid additionally results in a less basic system and results in the liberation of polar organic compound that was chemically bound in certain polymerization by-products.

DETAILED DESCRIPTION OF THE INVENTION

The poly(arylene sulfide) polymers produced by this invention are generally prepared by reacting at least one sulfur source, at least one dihaloaromatic compound and a polar organic compound under suitable polymerization conditions.

Dihaloaromatic compounds which can be employed in the process of this invention can be represented by the formula

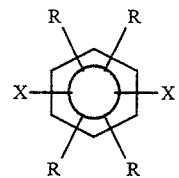

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24. While the halogen atoms can be in any position in the dihaloaromatic compound, it is preferred to employ p-dihalobenzenes as the dihaloaromatic compound.

Examples of suitable p-dihalobenzenes include p-dichlorobenzene (DCB), p-dibromobenzene, p-diiodobenzene, 1-chloro-4-bromobenzene, 1-chloro-4-iodobenzene, 1-bromo-4-iodobenzene, 2,5-dichlorotoluene. 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromo-benzene, 1-hexyl-3-dodecyl-2,5-dichlorobenzene, 1-octadecyl-2,5-diiodobenzene, 1-phenyl-2-chloro-5-bromobenzene, 1-(p-tolyl)-2,5-dibromobenzene, 1-benzyl-2,5-dichlorobenzene, 1-octyl-4-(3-methylcyclopentyl)-2,5-dichlorobenzene and the like, and mixtures of any two or more thereof. The preferred dihaloaromatic compound for use in this invention is p-dichlorobenzene (DCB) due to availability and effectiveness.

Any suitable sulfur source can be employed in the process of this invention. Suitable sulfur sources are disclosed in U.S. Pat. No. 3,919,177, which is hereby incorporated by reference. Such suitable sulfur sources include, but are not limited to thiosulfates, thioureas, thioamides, elemental sulfur, thiocarbamates, metal disulfides and oxysulfides, thiocarbonates, organic mercaptans, organic mercaptides, organic sulfides, alkali metal sulfides and bisulfides and hydrogen sulfide. It is presently preferred to use an alkali metal sulfide as the sulfur source.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by tile reaction of an alkali metal hydroxide with an alkali metal bisulfide in aqueous solution. It is preferred to use sodium sulfide or a combination of sodium bisulfide and sodium hydroxide as the sulfur source in this invention.

The polar organic compounds useful in the present invention are solvents for the dihaloaromatic compounds and the sulfur source used in the production of poly(arylene sulfide) polymers. Examples of such polar organic compounds include amides, including lactams, and sulfones. Specific examples of such polar organic compounds include hexamethylphosphoramide, tetramethylurea, N,N'-ethylenedipyrrolidone, N-methyl-2-pyrrolidone (NMP), pyrrolidone, caprolactam, N-ethylcaprolactam, sulfolane, N,N'-dimethylacetamide, 1,3-dimethyl-2-imidazolidinone, low molecular weight polyamides, and the like. The polar organic compound presently preferred is NMP.

It is within the scope of this invention to employ other components in the polymerization reaction mixture or during the polymerization. For example, molecular weight modifying or enhancing agents such as alkali metal carboxylates, lithium halides, or water can be added or produced during polymerization. Suitable alkali metal carboxylates which can be employed include those having the formula R'CO$_2$M where R' is a hydrocarbyl radical selected from alkyl, cycloalkyl, aryl, alkylaryl, arylalkyl, and the number of carbon atoms in R' is in the range of 1 to about 20, and M is an alkali metal selected from lithium, sodium, potassium, rubidium and cesium. The alkali metal carboxylate can be employed as a hydrate or as a solution or dispersion in water. The preferred alkali metal carboxylate is sodium acetate due to availability and effectiveness.

Additionally reactants such as comonomers can optionally be included. Suitable comonomers include polyhaloaromatic compounds having more than two halogen atoms, such as trichlorobenzene.

For example, polyhalo-substituted aromatic compounds having more than two halogen substitutions can be employed as reactants in order to prepare branched, relatively high molecular weight poly(arylene sulfide) polymers. Suitable polyhalo-substituted compounds which can be employed are disclosed in U.S. Pat. No. 3,354,129. It is presently preferred to use 1,2,4-trichlorobenzene (TCB) as the polyhalo-substituted compound when optionally employed.

As previously noted, a base can optionally be employed as a reactant. It is preferable to use a base when the sulfur source employed is an alkali metal bi-sulfide. If a base is employed, alkali metal hydroxides are typically employed. When employed, it is presently preferred to use sodium hydroxide as the base.

Although the ratio of reactants can vary considerably, the molar ratio of dihaloaromatic compound to sulfur source should be within the range of about 0.8 to about 2, preferably from 0.95 to about 1.3. The molar ratio of polar organic compound added with the other reactants to sulfur source should be within the range of about 2 to about 8. The amount of polyhalo-substituted aromatic compound optionally employed as a reactant is that amount necessary to achieve the desired degree of branching, causing the polymer to exhibit the required melt flow. Generally, about 0.0004 to 0.02 moles of polyhalo-substituted aromatic compound per mole of dihaloaromatic compound are employed. When an alkali metal carboxylate is employed, the mole ratio of alkali metal carboxylate to dihaloaromatic compounds should be within the range of about 0.02 to about 4, preferably from about 0.1 to about 2.

The reactants can be introduced into contact in any order. Water which is introduced with the reactants can be removed prior to polymerization.

The temperature at which the polymerization is conducted is generally within the range of about 235° to about 450° C., preferably from about 240° to about 350° C. The pressure need be only sufficient to maintain the dihaloaromatic compound and polar organic compound substantially in the liquid phase and to retain the sulfur source therein. The reaction time is within a range of about 10 minutes to 3 days, preferably from 1 hour to 8 hours.

According to this invention, an amount of an acidic solution is added to the polymerization reaction mixture prior to termination of the polymerization reaction. In other words, an amount of an acidic solution is added to the polymerization reaction mixture while maintaining polymerization conditions and thereafter the polymerization is terminated. The term "termination of the polymerization" is not meant to imply that complete reaction of the reactants (or 100% conversion) has taken place. Termination of the polymerization reaction can take place, for example, by removing the heating means and allowing the temperature of the reaction mixture to fall below that at which substantial polymerization takes place. Generally, this temperature will be below 235° C.

In order to optimize the economics of the invention process, the acidic solution is contacted with the reaction mixture after an appreciable amount of polymerization has taken place, but prior to termination of the reaction. If the acidic solution is added too early in the polymerization, the polymerization reaction will be slowed or stopped and the molecular weight of the polymer will be low. It is therefore presently preferred to contact the reaction mixture with the acidic solution immediately prior to termination of the polymerization reaction. By the term "immediately prior to termination", it is meant that no significant amount of time lapses between addition of the polar organic compound and termination of polymerization. It is recognized that addition and dispersion of the acidic solution in the reaction mixture may take some amount of time and actual termination of polymerization conditions can take some time due to the time necessary for cooling the reaction mixture. Although those of ordinary skill in the art can determine the time involved without undue experimentation, it is envisioned that commencement of termination of the polymerization conditions would occur within ½ hour of the completion of the addition of acidic compound to the reaction mixture.

The amount of acidic solution added prior to termination of the polymerization is that amount suitable to reduce the basicity of the reaction mixture and to reduce the amount of ash-causing polymer impurities in the poly(arylene sulfide) polymer. Generally, the mole ratio of added acid to poly(arylene sulfide) will be in the range of 0.025 to 0.100, preferably 0.40 to 0.80.

Any suitable organic or inorganic acids which are soluble in, or miscible with, the polar organic compound can be used in the acidic solution. It is presently preferred to use a water soluble acid or an aqueous acidic solution. Examples of suitable organic acids include, but are not limited to acetic acid, formic acid, oxalic acid, fumaric acid, and monopotassium phthalic acid. The presently preferred organic acid is acetic acid. Examples of suitable inorganic acids include, but are not limited to hydrochloric acid, monoammonium phosphate, sulfuric acid, phosphoric acid, boric acid, nitric acid, sodium dihydrogen phosphate, ammonium dihydrogen phosphate, carbonic acid and H$_2$SO.

After the treatment of the reaction mixture with the acidic solution, the polymerization reaction is terminated, for example, by cooling the reaction mixture or by contacting the reaction mixture with a polymerization inhibiting compound.

Thereafter, the polymer is recovered. The poly(arylene sulfide) polymers produced by the process of this invention can be separated from the reaction mixture by conventional procedures, for example, by filtration of the polymer, followed by washing with water, or by dilution of the reaction mixture with water, followed by filtration and water washing the polymer. The polymers can be recovered by a "flash" process such as that disclosed in U.S. Pat. No. 3,800,845, or by employing a separation agent as described in U.S. Pat. No. 4,415,729.

The polymer which has been contacted with the acidic solution while under reaction conditions generally contains relatively fewer ash causing impurities than polymers which have not been acid-treated. The measure of the amount of ash-causing impurities is referred to herein as the ash content. The expressing "ash content" refers to the concentration of inorganic compounds produced as a result of the oxidation of ionic impurities in the poly(arylene sulfide). The polymer prepared according to this invention can be blended with various additives such as fiber reinforcements, fillers, pigments, nucleating agents, plasticizers, corrosion inhibitors, mold release agents, pigments and the like.

The following examples are provided in order to further illustrate the invention and are not meant to limit the scope thereof.

EXAMPLES

In the following examples, the polyphenylene sulfide (PPS) melt flow rates were determined by the method of ASTM D 1238-86, Procedure B-Automatically Timed Flow Rate Procedure, Condition 316/5.0, modified to use a 5 minute preheat. The values of flow rate are expressed as grams per ten minutes (g/10 min).

The relative amounts of volatiles present in polymer samples were measured using a quartz crystal microbalance (QCM). This test involved vaporizing volatiles material from a solid PPS sample, collecting the vapors on a water cooled, vibrating quartz crystal, and estimating the amount of condensed material by changes in frequency of the vibrating crystal. A weighed sample of the PPS polymer was placed in the bottom of a heated (290° C.) stainless steel beaker that was covered with a lid containing the vibrating crystal. As vapors condensed on the crystal, the resonance frequency of the crystal decreased in proportion to the amount deposited. Test values are reported in terms of a dimensionless relative number proportional to the change in frequency of the crystal in a 30 minute test time. Lower reported values indicate that the test sample had a lower level of volatiles at the test temperature than samples with higher QCM values.

Ash contents were determined by burning a weighed portion of the polymer in a platinum dish. Residual carbonaceous material was removed by heating at 1000° F. in a muffle furnace. The weight of the remaining residue (ash) is expressed as a fraction of the original weight of the polymer.

Example I

This example describes the preparation of a poly(phenylene sulfide) polymer according to this invention. First, a mixture of 71.42 lbs. of a 50 weight percent sodium hydroxide (NaOH) aqueous solution with 86.74 lbs of a solution containing 60 weight percent sodium hydrosulfide (NaSH) and 0.4 weight percent sodium sulfide ($Na_2S$) was prepared. This solution, 25 lbs. of sodium acetate (NAOAc) powder, and 27.5 gal. of N-methyl-2-pyrrolidone (NMP) were added to a stirred (400 rpm) reactor, which was then purged with nitrogen. This mixture was heated to about 342° F. and dehydrated to remove water while the temperature increased to about 411° F.

Then 139.49 lbs. of p-dichlorobenzene (DCB) in 6 gals. of NMP was charged to the reactor. The mixture was heated to about 540° F. and held for 1.5 hours.

Then 2000 mL of glacial acetic acid was added to the reactor with 1 gal. of NMP and allowed to react with the reaction mixture for about 5 minutes at 535° F.

Then the reaction mixture was flashed at about 540° F. to remove the NMP and solidify the poly(phenylene sulfide) (PPS) polymer. The dry, salt-filled polymer was twice washed with 120 gal. of deionized water at ambient temperature, then filtered, then was washed with 80 gal. of deionized water at 350° F. for 30 minutes. The solution was filtered to recover 59 lbs. of PPS, designated polymer 1. Tile recovered PPS exhibited a melt flow rate of 760 g/10 min. when measured according to ASTM D-1238 (315/5) modified to use a 5 minute preheat time, an ash content of 0.23, and a QCM of 2.6. A 40 lb. sample of polymer 1 was charged to a cure vessel (a 3 ft.$^3$ ribbon blender) and heated at temperatures between 400°–410° F. for approximately 15½ hours. Polymer 1's melt flow was again measured and found to be 334 g/10 minutes.

Example II

Polymer 2 was prepared, acid treated, recovered, and heat treated in a manner similar to Polymer 1. Polymer 2 exhibited a flow rate of 760 g/10 minutes prior to heat treatment in the cure vessel and 329 after heat treatment. The ash content of Polymer 2 was found to be 0.23, and the QCM was 2.5.

Example III

Polymer 3 was prepared like Polymers 1 and 2, except that after the flash recovery step, the polymer was washed at 350° F. with an acetic acid solution having a pH of 5.5, then the polymer was recovered using a belt filter while being sprayed with deionized water at 180° F. The melt flow of Polymer 3 was then measured and found to be 932 g/10 min. Polymer 3 was found to have an ash content of 0.10 and a QCM of 7.2.

Polymer 3 was then heat treated as described in Example I. Forty-one lbs. of Polymer 3, having a melt flow rate of 332 g/10 min. were finally recovered.

Based on the QCM values, it was determined that use of an acid-treatment after polymer recovery provided a polymer with a larger amount of volatiles.

Example IV

Compounds 1, 2 and 3 were prepared from Polymers 1–3, respectively, in order to determine their suitability for use in injection molding applications. For comparison, compounds were prepared from two commercially available polymers as well. Compound 4 was prepared using Ryton ® PPS PR-26, available from Phillips Petroleum Company, which had a melt flow of 332 g/10 min. after heat treatment as described in Example I and an ash content of 0.24. Compound 5 was prepared form Torelina ® L2840 from Toray Phillips Petroleum Inc., which had a melt flow of 331 g/10 min. after heat treatment as described in Example I and an ash content of 0.05.

Compounds were prepared by tumble blending mixtures of each of the PPS polymer powders and glass fiber and additives in a plastic bag. The fiberglass and additives were selected form G-filament fiberglass, in this example 0C497EE supplied by Owens-Corning; an epoxysilane, in this example gamma-glycidoxypropyl-trimethoxysilane available from Union Carbide as TC- 100; a hydrotalcite, in this example DHT-4A supplied by Kyowa Chemical Industry; a polyetheretherketone, in this example 150 PF supplied by ICI; and a high density polyethylene, in this example TR-161 supplied by Phillips Chemical Company. This dry blend was the melt mixed in a 1.5-inch, 24:1 (L:D), Davis-Standard, single screw extruder at temperature settings of 620°–640° F. Extrudate was chopped axed then molded into test specimens using an Arburg ECO 305 injection molder using procedures known to those skilled in the art. All samples were annealed for two hours at 392° F. before testing. The test specimens produced were tensile bars (dogbone shaped having dimensions of 1/16 inch thick by 4 inches long by ¼ or ¾ inch wide depending on the location of the specimen) and flexural bars (⅛ inch thick by 5 inches long by ½ inch wide).

The test specimens were evaluated for mechanical properties according to the following test procedures:

| | |
|---|---|
| Tensile: | ASTM D 638 type IV bars, cross-head speed of 0.5 cm/min. |
| Flexural Modulus and Flexural Strength: | ASTM D 790 |
| IZOD impact strength, Notched and Unnotched: | ASTM D 256 |

Each of the compounds prepared in Example IV were also tested to determine their melt crystallization behavior. The melt crystallization temperatures were determined using a Perkin Elmer DSC-2C differential scanning calorimeter with attached 3500 Data Station. Samples of 5 to 10 mg of each polymer were used; cooling was started at a temperature of 320° C. and occurred at a rate of 160° C. per minute.

Polymers and compounds which exhibit higher Tmcs generally crystallize more quickly in the mold during injection molding, thus shortening cycle time.

The compound formulations are set out in Table I.

The results of the mechanical and melt crystallization evaluations are presented in Table II.

TABLE I

| Compound | Weight Percentages of Components[a] | | | | | |
|---|---|---|---|---|---|---|
| | PPS | Glass Fiber | Organo-silane | PEEK | PE | Hydrotalcite |
| 1 | 57.5 | 40 | 0.8 | 0.45 | 0.25 | 1.0 |
| 2 | 57.5 | 40 | 0.8 | 0.45 | 0.25 | 1.0 |
| 3 | 57.5 | 40 | 0.8 | 0.45 | 0.25 | 1.0 |
| 4 | 57.5 | 40 | 0.8 | 0.45 | 0.25 | 1.0 |
| 5 | 57.5 | 40 | 0.8 | 0.45 | 0.25 | 1.0 |

[a]The weight percentages are based on the total weight of the components compositions.

TABLE II

| Compound | 1 | 2 | 3 | 4 | 5 |
|---|---|---|---|---|---|
| Flow Rate (g/10 min.) | 27 | 31 | 35 | 25 | 20 |
| Tmc (160° C./min.) | 198.6 | 193.9 | 189.4 | 196.3 | 192.7 |
| Tensile Strength (ksi) | 25.87 | 26.3 | 25.38 | 26.62 | 26.89 |
| Elongation (%) | 1.27 | 1.34 | 1.36 | 1.43 | 1.42 |
| Flexural Modulus (Msi) | 2 | 2.03 | 2.02 | 2.05 | 2.01 |
| Flexural Strength (ksi) | 40.35 | 40.17 | 39.67 | 40.2 | 42.12 |
| Unnotched Izod (ft. lb./in.) | 11.99 | 11.98 | 12.41 | 11.61 | 12.59 |
| Notched Izod (ft. lb./in.) | 1.55 | 1.53 | 1.54 | 1.51 | 1.51 |

TABLE II-continued

| Compound | 1 | 2 | 3 | 4 | 5 |
|---|---|---|---|---|---|
| (ft. lb./in.) | | | | | |

Example V

This example describes the treatment of the polymer reaction mixture with carbon dioxide.

A mixture of 73.24 lbs. of a 50 weight percent sodium hydroxide (NaOH) aqueous solution with 117.7 lbs. of a solution containing 60 weight percent sodium hydrosulfide (NaSH) and 0.4 weight percent sodium sulfide ($Na_2S$) was prepared. This solution, 23 lbs. of sodium acetate (NAOAc) powder, and 30 gals. of N-methyl-2-pyrrolidone (NMP) were added to a stirred (400 rpm) reactor, which was then purged with nitrogen. This mixture was heated to about 216° F. and dehydrated to remove water while the temperature was increased to about 417° F.

Then 137.36 lbs. of p-dichlorobenzene (DCB) in 6 gals. of NMP was charged to the reactor. The mixture was heated to about 440° F. and held for 2 hours, then the mixture was further heated to about 510° F. and held for 2 hours.

Then the reactor was pressured from 160 to 190 psig with $CO_2$ while the temperature was held at 510° F. To maintain the 190 psig pressure, the reactor was pressured a total of three times over a ½ hour period.

Then the reaction mixture was flashed at about 540° F. to remove the NMP and solidify the poly(phenylene sulfide) (PPS) polymer. The dry, salt-filled polymer was washed in the same manner described in Example I.

The filtrate from two 80° C. deionized water washes of a reactor sample before flash was analyzed using HCl titration for unreacted NaSH and other by-products. The results of the titration indicated that unreacted NaSH remained in an amount of 1.5 weight-%, based on the PPS polymer. The pH of the filtrate was 9.4, thus the treatment of the reaction mixture with the $CO_2$ was not effective to completely neutralize the reaction mixture.

Example VI

Another polymerization was performed like that of Example V except that instead of adding $CO_2$ at 510° F., 1500 mE glacial acetic acid was added with 1 gal. NMP. The mixture was held at 510° F. for 30 minutes then the temperature was raised to 540° F. and the polymer recovered as described in Example V. The filtrate from a reactor sample was analyzed as described in Example V. The pH of the filtrate was 7.3, demonstrating that the addition of the acetic acid to the reaction mixture served to neutralize the basic reaction mixture. A negligible amount of unreacted NaSH was detected by titration.

That which is claimed is:

1. A process for producing a poly(arylene sulfide) polymer which comprises
   contacting reactants comprising at least one sulfur source, at least one dihaloaromatic compound and a polar organic compound to form a polymerization reaction mixture,
   subjecting said polymerization reaction mixture to suitable polymerization conditions to form said poly(arylene sulfide) polymer, contacting said reaction mixture with an acidic solution while maintaining said suitable polymerization conditions, and thereafter recovering said poly(arylene sulfide) polymer.

2. A process according to claim 1 wherein said suitable conditions comprise a polymerization reaction temperature in the range of about 235° to about 450° C.

3. A process in accordance with claim 1 wherein the amount of acidic solution employed is in the range of about 0.025 mol to about 0.100 mol, based on 1 mole poly(arylene sulfide).

4. A process in accordance with claim 3 wherein said acidic solution is an acetic acid solution.

5. A process in accordance with claim 1 wherein said poly(arylene sulfide) polymer is poly(phenylene sulfide).

6. A process in accordance with claim 1 wherein said acidic solution and said reaction mixture are contacted for a time period at least sufficient to disperse the acidic solution in reaction mixture.

7. A process in accordance with claim 1 wherein said reaction mixture is subjected to said suitable conditions for a time period in the range of 10 mins. to 3 days.

8. A process in accordance with claim 7 wherein said acidic solution is contacted with said reaction mixture during the time period in the range of 5 minutes up to about 45 minutes prior to recovery of said poly(arylene sulfide) polymer.

9. A process for preparing a poly(phenylene sulfide) polymer which comprises contacting reactants comprising dichlorobenzene, sodium sulfide, sodium hydroxide, N-methyl-2-pyrrolidone to form a polymerization reaction mixture, subjecting said polymerization reaction mixture to polymerization conditions of temperature in the range of about 235° C. to about 450° C. and time in the range of about 1 hour to 8 hours, contacting said reaction mixture with an acidic solution while maintaining said polymerization conditions, and thereafter recovering said poly(phenylene sulfide) polymer.

10. A process according to claim 9 wherein said acidic solution is an acetic acid solution.

* * * * *